US010445375B2

(12) United States Patent
Otagaki (10) Patent No.: US 10,445,375 B2
(45) Date of Patent: Oct. 15, 2019

(54) RETRIEVAL INFORMATION GENERATION DEVICE, IMAGE PROCESSING DEVICE, AND NON-TRANSITORY COMPUTER READABLE MEDIUM

(71) Applicant: FUJI XEROX CO., LTD., Tokyo (JP)

(72) Inventor: Toru Otagaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 14 days.

(21) Appl. No.: 15/644,844

(22) Filed: Jul. 10, 2017

(65) Prior Publication Data

US 2018/0276209 A1  Sep. 27, 2018

(30) Foreign Application Priority Data

Mar. 24, 2017  (JP) .................. 2017-058954

(51) Int. Cl.
*G06F 16/93* (2019.01)
*H04N 1/21* (2006.01)
*G06F 16/904* (2019.01)
*G06F 16/33* (2019.01)
*G06F 16/34* (2019.01)

(52) U.S. Cl.
CPC .......... *G06F 16/93* (2019.01); *G06F 16/3344* (2019.01); *G06F 16/345* (2019.01); *G06F 16/904* (2019.01); *H04N 1/2179* (2013.01); *H04N 2201/0081* (2013.01); *H04N 2201/0089* (2013.01)

(58) Field of Classification Search
None
See application file for complete search history.

(56) References Cited

U.S. PATENT DOCUMENTS

| 4,748,678 | A | * | 5/1988 | Takeda | G06F 17/30017 |
| | | | | | 382/236 |
| 5,369,742 | A | * | 11/1994 | Kurosu | G06F 17/30259 |
| | | | | | 382/176 |
| 5,799,325 | A | * | 8/1998 | Rivette | G06F 13/4063 |
| | | | | | 707/E17.008 |
| 6,717,686 | B1 | * | 4/2004 | Farros | G06F 3/1205 |
| | | | | | 358/1.1 |
| 7,693,813 | B1 | * | 4/2010 | Cao | G06F 17/30616 |
| | | | | | 707/999.001 |
| 8,937,737 | B2 | | 1/2015 | Tsutsumi et al. | |
| 9,158,770 | B1 | * | 10/2015 | Beadles | H04L 67/02 |

(Continued)

FOREIGN PATENT DOCUMENTS

JP      2013025331      2/2013

*Primary Examiner* — Anh-Vinh T Nguyen
(74) *Attorney, Agent, or Firm* — JCIPRNET (57) ABSTRACT

A retrieval information generation device includes a determination unit that determines retrieval document information for retrieving a phrase in an original document from an original document file which is created by reading the original document by an image reading device and is identified on the basis of identification information, an extraction unit that extracts retrieval image information for visually specifying the original document from the original document file, and a generation unit that associates the retrieval document information and the retrieval image information with the identification information of the original document file to generate a retrieval file.

17 Claims, 8 Drawing Sheets

(56) References Cited

U.S. PATENT DOCUMENTS

| | | | | |
|---|---|---|---|---|
| 2001/0053252 | A1* | 12/2001 | Creque | G06F 17/30011 382/305 |
| 2002/0035697 | A1* | 3/2002 | McCurdy | G06F 21/10 726/3 |
| 2002/0087512 | A1* | 7/2002 | Morikawa | G06F 17/30067 |
| 2002/0091697 | A1* | 7/2002 | Huang | G06F 16/9535 |
| 2002/0129129 | A1* | 9/2002 | Bloch | G06F 8/61 709/220 |
| 2004/0255218 | A1* | 12/2004 | Tada | G06F 17/30011 714/747 |
| 2008/0077550 | A1* | 3/2008 | Shike | G06F 17/30011 |
| 2008/0294667 | A1* | 11/2008 | Kopf | H04L 67/025 |
| 2009/0019010 | A1* | 1/2009 | Takeya | G06F 17/30011 |
| 2009/0024920 | A1* | 1/2009 | Bulpitt | G06F 17/30905 715/700 |
| 2010/0293621 | A1* | 11/2010 | Shuster | G06F 21/564 726/30 |
| 2014/0108606 | A1* | 4/2014 | Beadles | H04L 67/02 709/217 |
| 2014/0280061 | A1* | 9/2014 | Elkhou | G06F 17/30011 707/722 |
| 2014/0325328 | A1* | 10/2014 | Beadles | G06F 17/2235 715/208 |
| 2014/0337761 | A1* | 11/2014 | Glass | H04L 65/403 715/753 |
| 2015/0008257 | A1* | 1/2015 | Beadles | G06F 16/9554 235/375 |
| 2015/0220631 | A1* | 8/2015 | Sherman | G06F 17/30991 707/723 |
| 2015/0286636 | A1* | 10/2015 | Elkhou | G06Q 50/18 707/722 |
| 2015/0286706 | A1* | 10/2015 | Morimoto | G06Q 50/18 707/730 |

* cited by examiner

RETRIEVAL INFORMATION GENERATION DEVICE, IMAGE PROCESSING DEVICE, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-058954 filed Mar. 24, 2017.

BACKGROUND

(i) Technical Field

The present invention relates to a retrieval information generation device, an image processing device, and a non-transitory computer readable medium storing a retrieval information generation program.

(ii) Related Art

In general, the retrieval of a document file is performed by performing processing of opening the document file to confirm the contents of the document file, reading and scanning a document within the document file to add a cover having the same style as the document to the top of the document file, referring to a thumbnail image of each page, registering a keyword in metadata, and setting an OCR result to be a file name, as groundwork.

SUMMARY

According to an aspect of the invention, there is provided a retrieval information generation device including a determination unit that determines retrieval document information for retrieving a phrase in an original document from an original document file which is created by reading the original document by an image reading device and is identified on the basis of identification information, an extraction unit that extracts retrieval image information for visually specifying the original document from the original document file, and a generation unit that associates the retrieval document information and the retrieval image information with the identification information of the original document file to generate a retrieval file.

BRIEF DESCRIPTION OF THE DRAWINGS

Exemplary embodiment(s) of the present invention will be described in detail based on the following figures, wherein.

DETAILED DESCRIPTION

Figure 1:
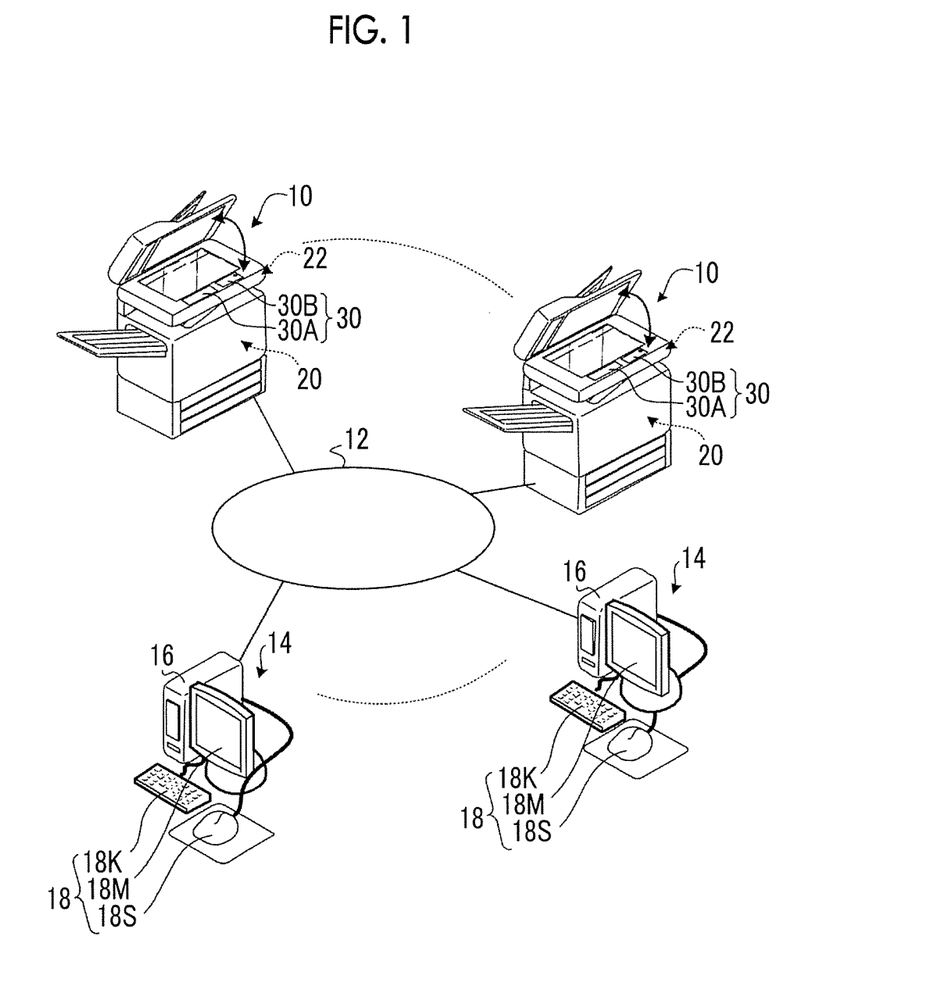
FIG. 1 is a schematic diagram of a communication line network including an image processing device according to this exemplary embodiment.

As illustrated in FIG. 1, an image processing device 10 according to this exemplary embodiment is connected to a communication line network 12 such as the Internet. The communication line network 12 is, for example, a local area network (LAN) or the Internet line, and plural LANs may be connected to each other by a wide area network (WAN). In addition, all communication line networks 12 including the communication line network 12 are not required to be connected to each other in a wired manner. That is, a portion or all of the communication line networks may be wireless communication line networks through which information is transmitted and received in a wireless manner.

Meanwhile, in FIG. 1, two image processing devices 10 are connected to each other. However, the number of image processing devices is not limited, and may be one or three or more.

In addition, plural personal computers (PCs) 14 as information terminal devices are connected to the communication line network 12. The PC 14 includes a main body 16 and a user interface (UI) 18. The UI 18 includes a monitor 18M as a display, and a keyboard 18K and a mouse 18S as input operation units.

Meanwhile, in FIG. 1, two PCs 14 are connected to each other. However, the number of PCs is not limited, and may be one or three or more. In addition, the information terminal devices are not limited to the PCs 14, and are not required to be connected to each other in a wired manner. That is, the communication line network may be a communication line network through which information is transmitted and received in a wireless manner.

As illustrated in FIG. 1, in the image processing device 10, for example, an instruction for transmitting data to perform image formation (printing) may be given to the image processing device 10 from the PC 14 in a remote manner, or a user standing in front of the image processing device 10 may give an instruction for processing such as copying, scanning (image reading), and facsimile transmission and reception by various operations.

Figure 2:
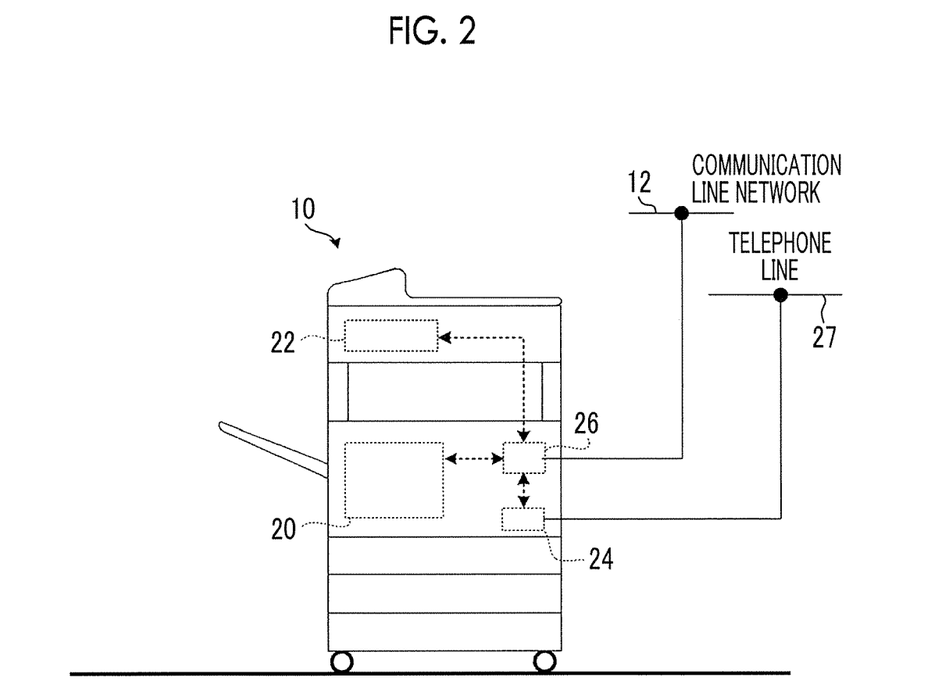
FIG. 2 is a front view of the image processing device according to this exemplary embodiment.

FIG. 2 illustrates the image processing device 10 according to this exemplary embodiment. The image processing device 10 includes an image forming unit 20 that forms an image on a recording sheet, an image reading unit 22 that reads a copy image, and a facsimile communication controller 24.

The image reading unit 22 is provided with a copy holder for positioning a copy, a scanning driving system that scans and irradiates an image of the copy placed on the copy holder with light, and a photoelectric conversion element, such as a CCD, which receives light reflected or transmitted by the scanning of the scanning driving system to convert the light into an electrical signal.

The image forming unit 20 includes a photoreceptor. A charging device that uniformly charges the photoreceptor, a scanning exposing unit that performs scanning with a light beam on the basis of image data, an image developing unit that develops an electrostatic latent image formed by the scanning and exposing of the scanning exposing unit, a transfer unit that transfers an image on the developed photoreceptor to a recording sheet, and a cleaning unit that cleans the surface of the transferred photoreceptor are provided in the vicinity of the photoreceptor. In addition, a fixing unit that fixes the image on the transferred recording sheet is provided on a transport path of the recording sheet.

The image processing device 10 includes a main controller 26, and controls the image forming unit 20, the image reading unit 22, and the facsimile communication controller 24 to temporarily store, for example, image data of a copy image read by the image reading unit 22 or to transmit the read image data to the image forming unit 20, the facsimile communication controller 24, or the PC 14.

Figure 3:
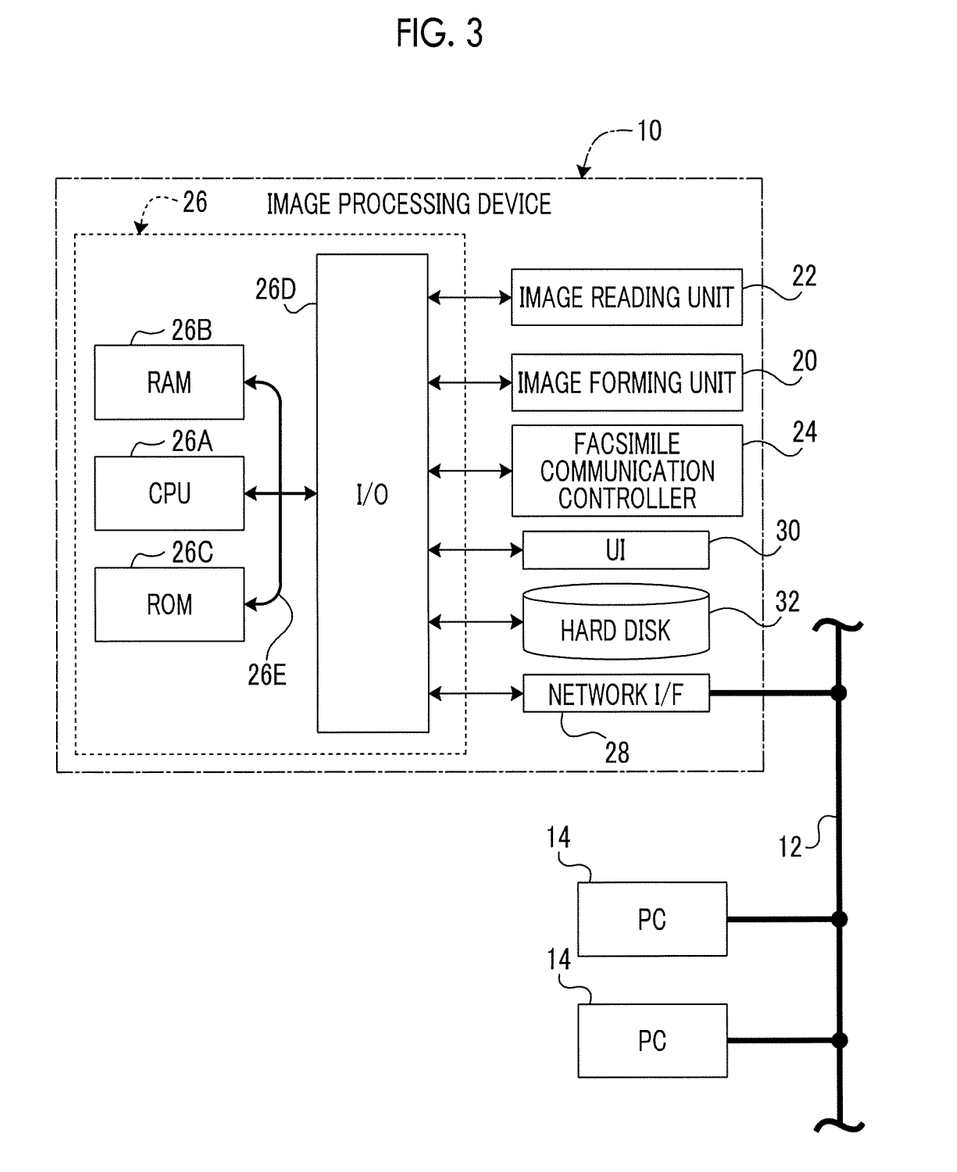
FIG. 3 is a block diagram illustrating a configuration of a control system of the image processing device according to this exemplary embodiment.

The communication line network 12 is connected to the main controller 26, and a telephone line 27 is connected to the facsimile communication controller 24. The main controller 26 is connected to the PC 14 (including a server and a host computer) through, for example, the communication line network 12, and functions to receive image data and perform facsimile reception and facsimile transmission by using the telephone line 27 through the facsimile communication controller 24.

FIG. 3 is a block diagram of a control system centering on the main controller 26 of the image processing device 10.

As illustrated in FIG. 3, the main controller 26 of the image processing device 10 includes a CPU 26A, a RAM 26B, a ROM 26C, an input and output unit 26D (hereinafter, referred to as an I/O 26D), and a bus 26E such as a data bus or a controller bus which connects these components to each other.

A network I/F 28 and a UI 30 (for example, a touch panel 30A and a hard key 30B, illustrated in FIG. 1, which are installed on the front side of a housing) which enable connection to the communication line network 12 are connected to the I/O 26D.

In addition, the image reading unit 22, the image forming unit 20, and the facsimile communication controller 24 are connected to the I/O 26D.

Further, a hard disk 32 as a large-size recording medium is connected to the I/O 26D. The hard disk 32 temporarily stores image information received from the PC 14 and the like, image information read by the image reading unit 22, image information received by the facsimile communication controller 24, and the like.

Retrieval Information Generation Function

Here, a non-transitory computer readable medium storing a retrieval information generation program is recorded in the ROM 26C of the main controller 26 of this exemplary embodiment. When a document file including images, characters, and signs is mainly created by the image reading device 10 reading a copy image, the non-transitory computer readable medium storing a retrieval information generation program is started up so that a process of generating retrieval information for retrieving the document file is executed by the CPU 26A. The main controller 26 in which the process of generating retrieval information by the start-up of the non-transitory computer readable medium storing a retrieval information generation program functions as a retrieval information generation device.

Figure 4:
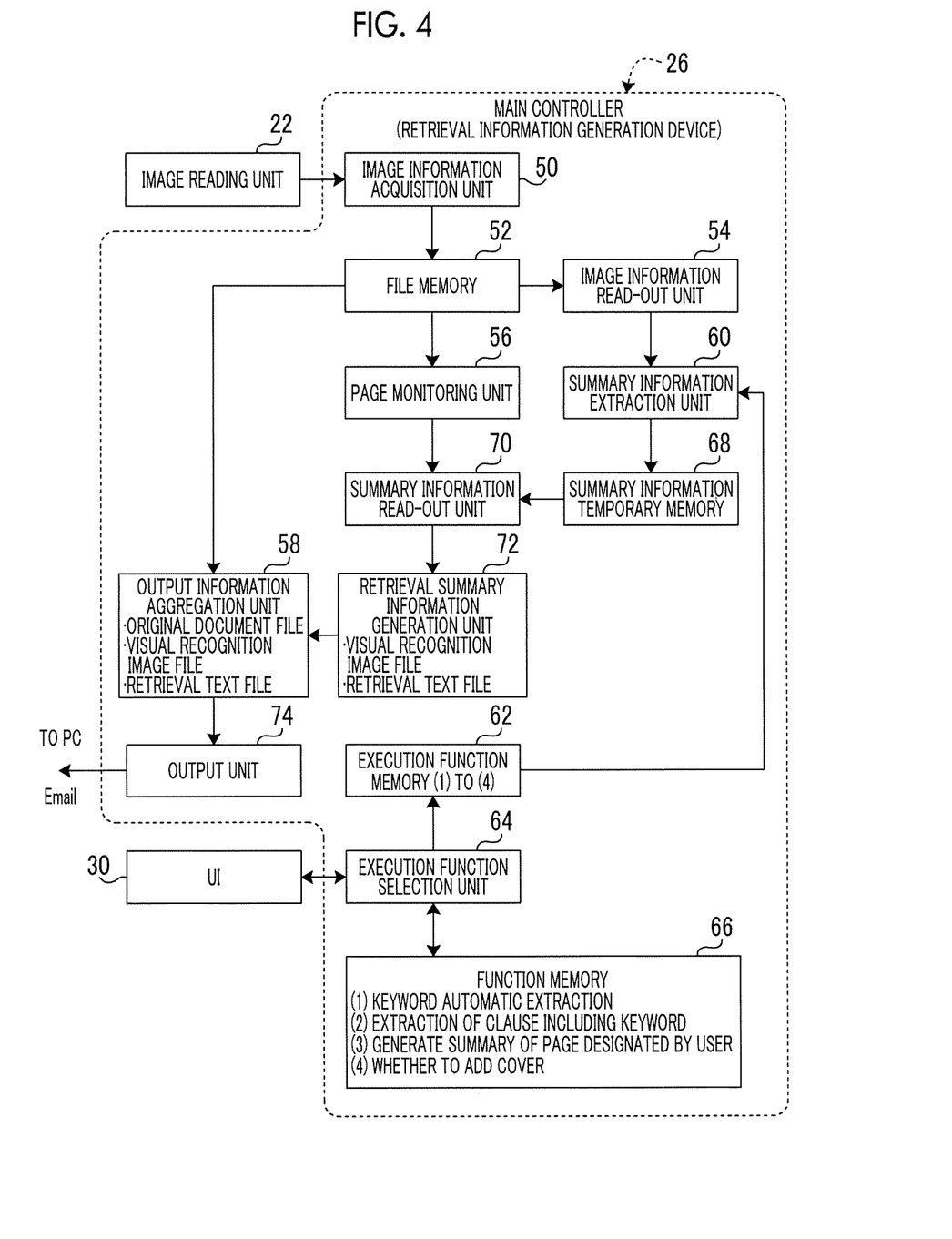
FIG. 4 is a function block diagram when a main controller of the image processing device according to this exemplary embodiment operates as a retrieval information generation device.

FIG. 4 is a control block diagram when the main controller 26 functions as a retrieval information generation device. Meanwhile, the control block diagram of FIG. 4 does not limit a hardware configuration of the main controller, and a portion or all of the functions may be executed by a software program.

The image reading unit 22 is connected to an image information acquisition unit 50, and an image read by the image reading device 22 is acquired by the image information acquisition unit 50 and is stored in a file memory 52 as an original document file.

The file memory 52 is connected to an image information read-out unit 54, a page monitoring unit 56, and an output information aggregation unit 58.

The image information read-out unit 54 reads out image information in units of pages of a document file, and transmits the image information to a summary information extraction unit 60 which is an example of a determination unit and an extraction unit.

The summary information extraction unit 60 recognizes an execution function (at least one execution function of (1) to (4) (plural functions can be selected)) to be described later which is stored in an execution function memory 62, and extracts summary information on the basis of the execution function.

The execution function memory 62 is connected to an execution function selection unit 64 which is an example of a selection unit. The execution function selection unit 64, which is connected to the UI 30 of the image processing device 10, accepts the selection of at least one function of the functions (1) to (4) stored in a function memory 66 in advance by a user's instruction from the UI 30, and the selected function is stored in the execution function memory 62. Meanwhile, a default is set so that any option (for example, all of the functions) is selected, and the function may be selected by the option of the default in a case where a user's designation is not made. In addition, the user's selection is not limited to the UI 30, and may be a remote operation from the PC 14.

The functions stored in the function memory 66 are as follows.

The function (1) is the automatic extraction of a keyword (retrieval keyword information determination function).

The function (2) is the extraction of a clause including a keyword (retrieval clause information determination function).

The function (3) is the generation of a summary of a page designated by the user (retrieval summary information determination function).

The function (4) is the addition of a cover to the original document file (retrieval cover information determination function).

The summary information extraction unit 60 is connected to a summary information temporary memory 68, and an accumulation of the summary information executed for each page is stored in the summary information temporary memory.

On the other hand, the page monitoring unit 56 is connected to a summary information read-out unit 70. When the page monitoring unit 56 recognizes that image information of the last page has been read out, the page monitoring unit instructs the summary information read-out unit 70 to read out summary information of all of the pages from the summary information temporary memory 68.

The summary information read-out unit 70 is connected to a retrieval summary information generation unit 72 which is an example of a generation unit, and transmits the read-out summary information for each page to the retrieval summary information generation unit 72.

The retrieval summary information generation unit 72 generates a visual recognition image file (retrieval image information) such as JPEG and a retrieval text file (retrieval document information) such as an HTML file on the basis of the summary information of the respective pages. The visual recognition image file may include text information included in the retrieval text file as an image (hereinafter, also referred to as "retrieval summary information").

The retrieval summary information generation unit 72 is connected to the output information aggregation unit 58, and transmits the generated visual recognition image file and retrieval text file to the output information aggregation unit 58.

The output information aggregation unit 58 reads out identification information (for example, URL information which is a storage destination of the original document file) of the original document file from the file memory 52 to generate a retrieval file in which the visual recognition image file and the retrieval text file are aggregated in association with each other. The retrieval file is output (transmitted to the designated PC 14 or transmitted by being attached to a mail) through the output unit 74.

Figure 5:
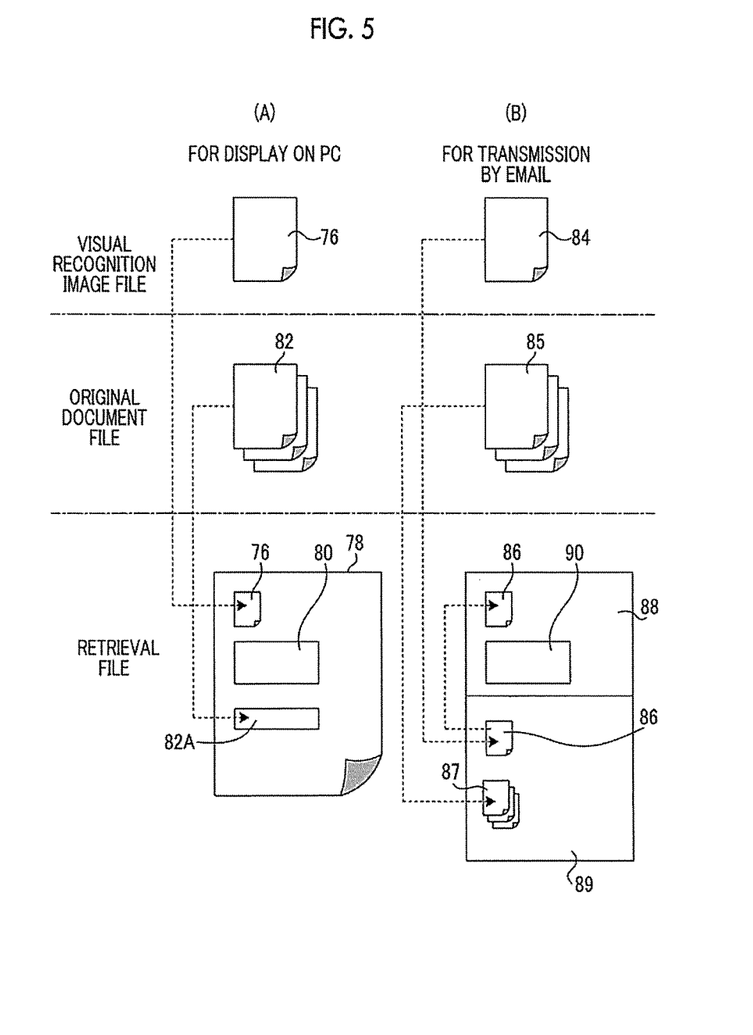
FIG. 5 is a conceptual diagram illustrating output states of retrieval summary information and an original document file according to this exemplary embodiment.

FIG. 5(A) illustrates an example of a storage mode when a retrieval file is output to the PC 14.

The visual recognition image file 76 created is aggregated in a retrieval file 78 having keyword retrievable character information 80 printed thereon.

In addition, URL information 82A linked with an original document file 82 is aggregated in the retrieval file 78.

That is, an image (visual recognition image file 76) to be visually confirmed, the keyword retrievable character information 80, and information (URL information 82A) linked with the original document file 82 are aggregated in the retrieval file 78 which is set for each document file, and thus it is possible to use the retrieval file 78 as a retrieval screen on the monitor 18M of the PC 14. In addition, the retrieval file 78 can also be used as the cover of the original document file.

FIG. 5(B) illustrates an example of a storage mode when a retrieval file is transmitted by mail.

In an attachment region 89 of a mail, a visual recognition image file 84 created is aggregated as an attached file 86, and an original document file 85 is aggregated as an attached file 87.

In addition, the visual recognition image file 84 may also be aggregated in a body region 88 of the mail.

Further, keyword retrievable character information 90 is aggregated in the body region 88 of the mail.

Meanwhile, URL information linked with the original document file may be aggregated in the body region 88.

That is, the visual recognition image file 84, the keyword retrievable character information 90, and the information (URL information)) linked with the original document file, as necessary, are aggregated in the body region 88 of the mail transmitted for each document file, and thus it is possible to use the body region as a retrieval screen.

In addition, the visual recognition image file 84 is aggregated in the attachment region 89 of the mail, and can be used for visual confirmation.

Hereinafter, the operation of this exemplary embodiment will be described with reference to a flow chart of FIG. 6.

Figure 6:
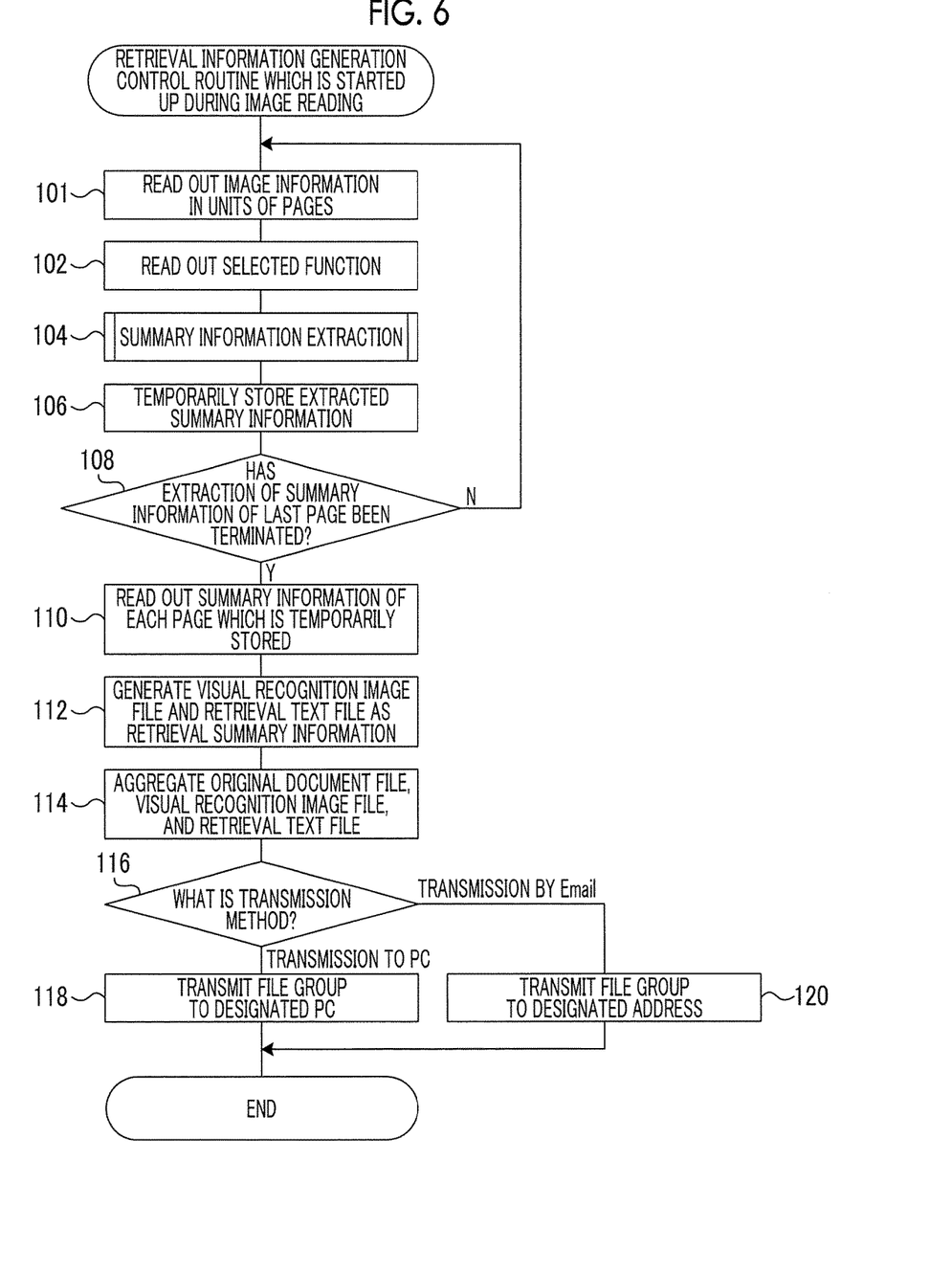
FIG. 6 is a flowchart illustrating a flow of a retrieval information generation control routine which is started up during image reading in the image processing device of this exemplary embodiment.

FIG. 6 is a flow chart illustrating a flow of a retrieval information generation control routine started up during image reading.

In step 100, image information is read out in units of pages. Subsequently, the processing proceeds to step 102 to read out the function which is currently selected from the execution function memory 62.

In the next step 104, summary information extraction is performed. A well-known technique can be applied to the summary information extraction itself, and summary information can be basically automatically extracted. Meanwhile, summary information manually obtained is not denied.

In the next step 106, the extracted summary information is temporarily stored in the summary information temporary memory 68, and the processing proceeds to step 108.

In step 108, it is determined whether or not the extraction of the summary information of the last page has been terminated. In a case where the determination result is negative, the processing returns to step 100 to perform the extraction of summary information of the next page.

In addition, in a case where the determination result in step 108 is affirmative, the processing proceeds to step 110 to read out the summary information of each page which is temporarily stored, and proceeds to step 112 to generate an aggregation of a visual recognition image file and a retrieval text file as retrieval summary information, and then proceeds to step 114.

In step 114, the original document file, the visual recognition image file, and the retrieval text file are aggregated (file group is created), and the processing proceeds to step 116.

In step 116, a transmission mode of the aggregated file group is determined.

When it is determined in step 116 that the transmission mode is a mode of transmission to the PC 14, the processing proceeds to step 118 to transmit the file group to the designated PC 14, and this routine is terminated.

In addition, when it is determined in step 116 that the transmission mode is a mode of email transmission, the processing proceeds to step 120 to transmit the file group to a designated address, and this routine is terminated.

Example

Figure 7A:
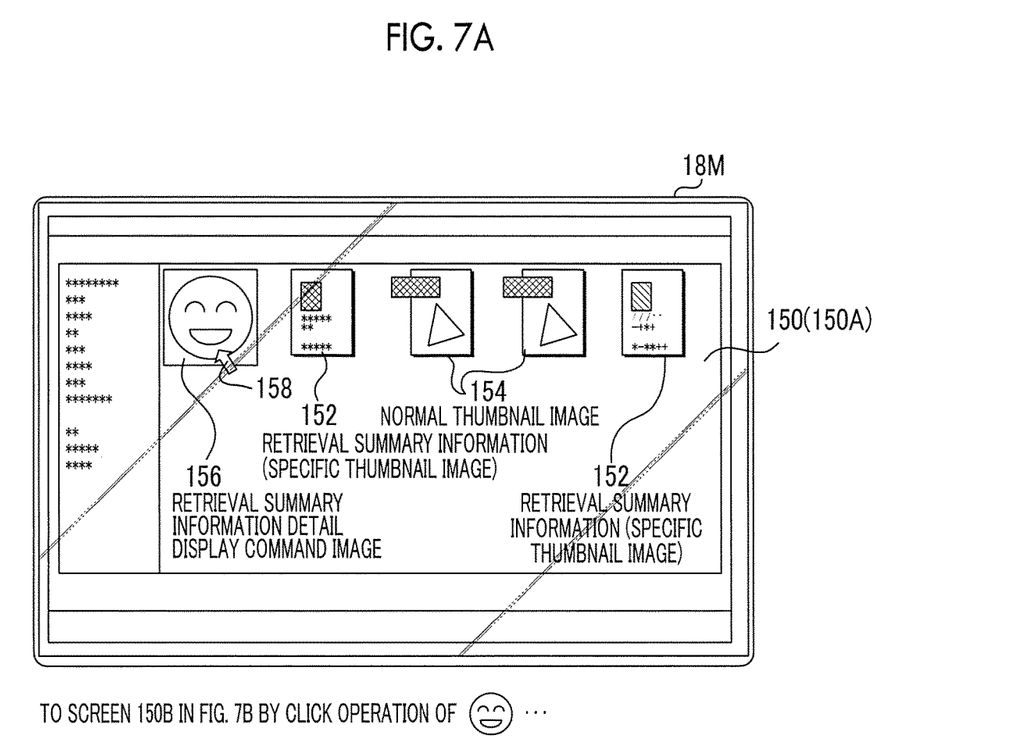
FIGS. 7A and 7B are front views of a retrieval screen displayed on a monitor of a PC according to an example of this exemplary embodiment.
Figure 7B:
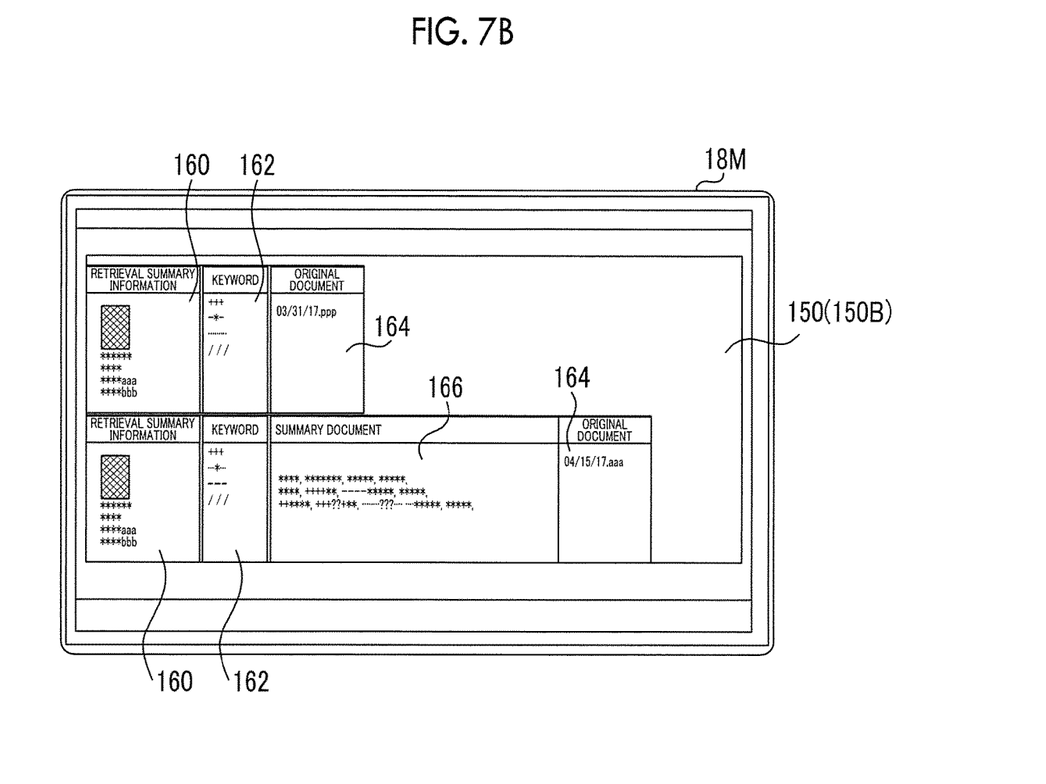

FIGS. 7A and 7B are examples of a retrieval screen 150 displayed on the monitor 18M of the PC 14.

As illustrated in FIG. 7A, a normal thumbnail image 154 specifying an original document file is displayed on a retrieval screen 150A.

In FIG. 7A, an image 152 of retrieval summary information in which an image of a visual recognition image file and a text of a retrieval text file are displayed, and the normal thumbnail image 154 are displayed together.

In FIG. 7A, the visual recognition image file and an image of text information of the retrieval text file are displayed in the image 152 of the retrieval summary information, and thus retrieval is more facilitated than in the normal thumbnail image 154.

In addition, a retrieval summary information detail display command image 156 (retrieval file) (hereinafter, simply referred to as a "command image 156") is displayed in FIG. 7A. When the command image 156 is selected (clicked or double-clicked) by being designated by, for example, a cursor 158, a changeover to a retrieval summary information detail display screen 150B illustrated in FIG. 7B is performed.

In the retrieval summary information detail display screen 150B of FIG. 7B, each retrieval file is displayed in a larger size than in a display state of FIG. 7A for each item described below.

(Item 1)

A retrieval summary information screen 160 (an example of the image 152 of the retrieval summary information of FIG. 7A) which is enlarged more than the specific thumbnail image 152 of FIG. 7A. Therefore, it is easier to view, for example, even an image hard to visually recognize in the display mode of FIG. 7A than in the display mode of FIG. 7A.

(Item 2)

A keyword information screen 162 which is equivalent to a retrieval text file. The retrieval text file is text (character) information, and thus it is possible to perform retrieval therefor.

(Item 3)

A URL information screen 164 of an original document file. For example, it is possible to open an original document by clicking a display region of URL information.

Meanwhile, as illustrated at a lower stage of FIG. 7B, a summary document screen 166 displaying a summary document (a clause including a keyword "equivalent to function (2)") between item (2) and item (3) is provided, and thus it is possible to further improve retrieval easiness.

Meanwhile, in this exemplary embodiment, the main controller 26 of the image processing device 10 is configured to function as a retrieval information generation device. However, a document file read by the image reading unit 22 of the image processing device 10 may be transmitted to any one PC 14, a server not shown in the drawing, or a host computer as it is and may be made to function as a retrieval information generation device in the PC 14, server, or host computer which is a transmission destination.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A retrieval information generation device comprising:
   a processor configured to:
      read out a function of generating a summary of a page in an original document designated by a user;
      extract summary information of the page from image information of an original document file which is created by reading the original document by an image reading device and is identified on the basis of identification information;
      generate a retrieval text file for retrieving a phrase in the page and a visual recognition image file for visually specifying the page as retrieval summary information on a basis of the extracted summary information; and
      aggregate the original document file, the retrieval text file and the visual recognition image file with the identification information of the original document file to generate a retrieval file.

2. The retrieval information generation device according to claim 1,
   wherein the processor has a first function of extracting a keyword from the original document to determine retrieval keyword information, a second function of extracting a clause including the keyword for each keyword to determine retrieval clause information, and a third function of adding a retrieval file generated by the generation unit as a cover of the original document to determine retrieval cover information, and
   wherein the processor is further configured to select at least one function of the first to third functions.

3. The retrieval information generation device according to claim 1, further comprising:
   a display that displays the retrieval file so as to be viewable.

4. The retrieval information generation device according to claim 2, further comprising:
   a display that displays the retrieval file so as to be viewable.

5. An image processing device comprising:
   the retrieval information generation device according to claim 1; and
   the image reading device.

6. An image processing device comprising:
   the retrieval information generation device according to claim 2; and
   the image reading device.

7. An image processing device comprising:
   the retrieval information generation device according to claim 3; and
   the image reading device.

8. An image processing device comprising:
   the retrieval information generation device according to claim 4; and
   the image reading device.

9. A non-transitory computer readable medium storing a retrieval information generation program causing a computer to function as the units constituting the retrieval information generation device according to claim 1.

10. A retrieval information generation device comprising:
    a determination means for reading out a function of generating a summary of a page in an original document designated by a user;
    an extraction means for extracting summary information of the page from image information of an original document file which is created by reading the original document by an image reading device and is identified on the basis of identification information, and generating a retrieval text file for retrieving a phrase in the page and a visual recognition image file for visually specifying the page as retrieval summary information on a basis of the extracted summary information; and
    a generation means for aggregating the original document file, the retrieval text file and the visual recognition image file with the identification information of the original document file to generate a retrieval file.

11. The retrieval information generation device according to claim 10,
    wherein the determination means has a first function of extracting a keyword from the original document to determine retrieval keyword information, a second function of extracting a clause including the keyword for each keyword to determine retrieval clause information, and a third function of adding a retrieval file generated by the generation means as a cover of the original document to determine retrieval cover information, and
    wherein the retrieval information generation device further comprises a selection means for selecting at least one function of the first to fourth third functions.

12. The retrieval information generation device according to claim 10, further comprising:
    a display means for displaying the retrieval file so as to be viewable.

13. The retrieval information generation device according to claim 11, further comprising:
   a display means for displaying the retrieval file so as to be viewable.

14. An image processing device comprising:
   the retrieval information generation device according to claim 10; and
   the image reading device.

15. An image processing device comprising:
   the retrieval information generation device according to claim 11; and
   the image reading device.

16. An image processing device comprising:
   the retrieval information generation device according to claim 12; and
   the image reading device.

17. An image processing device comprising:
   the retrieval information generation device according to claim 13; and
   the image reading device.

* * * * *